United States Patent
Motoi

(10) Patent No.: US 10,096,862 B2
(45) Date of Patent: Oct. 9, 2018

(54) LEAD-ACID BATTERY

(71) Applicant: GS Yuasa International Ltd., Kyoto-shi, Kyoto (JP)

(72) Inventor: Ikumi Motoi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 15/039,525

(22) PCT Filed: Nov. 10, 2014

(86) PCT No.: PCT/JP2014/005645
§ 371 (c)(1),
(2) Date: May 26, 2016

(87) PCT Pub. No.: WO2015/079631
PCT Pub. Date: Jun. 4, 2015

(65) Prior Publication Data
US 2016/0380311 A1    Dec. 29, 2016

(30) Foreign Application Priority Data
Nov. 29, 2013 (JP) .................. 2013-247059

(51) Int. Cl.
*H01M 2/16* (2006.01)
*H01M 10/06* (2006.01)
(Continued)

(52) U.S. Cl.
CPC ......... *H01M 10/06* (2013.01); *H01M 2/1653* (2013.01); *H01M 4/14* (2013.01);
(Continued)

(58) Field of Classification Search
CPC ...... H01M 10/06; H01M 2/1653; H01M 4/14; H01M 4/20; H01M 4/62; H01M 4/628;
(Continued)

(56) References Cited

U.S. PATENT DOCUMENTS 4,331,622 A * 5/1982 Doi ...................... B29C 67/202
264/41
6,074,782 A    6/2000 Kamio Takaki
(Continued)

FOREIGN PATENT DOCUMENTS

| JP | 6477882 A2 | 3/1989 |
|----|------------|--------|
| JP | 3140317 A2 | 6/1991 |

(Continued)

OTHER PUBLICATIONS

International Search Report dated Dec. 22, 2014 filed in PCT/JP2014/005645.

*Primary Examiner* — Jane J Rhee
(74) *Attorney, Agent, or Firm* — Rankin, Hill & Clark LLP

(57) ABSTRACT

A microporous acid-resistant resin separator has a total pore volume ratio of 55% or more and less than 75%. A negative electrode plate is made of an electrode material containing a bisphenol condensate. Thereby, a lead-acid battery can be obtained, which reduces the softening of a positive electrode material and has excellent low-temperature high rate discharge performance.

16 Claims, 7 Drawing Sheets

(51) Int. Cl.
  *H01M 4/14* (2006.01)
  *H01M 4/62* (2006.01)
  *H01M 4/73* (2006.01)
  *H01M 4/20* (2006.01)
  *H01M 4/66* (2006.01)

(52) U.S. Cl.
  CPC ............... *H01M 4/20* (2013.01); *H01M 4/62* (2013.01); *H01M 4/628* (2013.01); *H01M 4/662* (2013.01); *H01M 4/73* (2013.01); *H01M 2220/20* (2013.01); *Y02E 60/126* (2013.01); *Y02T 10/7016* (2013.01)

(58) Field of Classification Search
  CPC .... H01M 4/662; H01M 4/73; H01M 2220/20; H01M 4/678; Y02E 60/126; Y02T 10/7016
  See application file for complete search history.

(56) References Cited

U.S. PATENT DOCUMENTS

| | | | |
|---|---|---|---|
| 2005/0106468 A1* | 5/2005 | Deiters | H01M 2/1653 429/254 |
| 2007/0077497 A1* | 4/2007 | Funato | H01M 10/08 429/347 |
| 2007/0172727 A1 | 7/2007 | Sugie | |
| 2011/0045339 A1* | 2/2011 | La | H01M 2/1653 429/163 |
| 2011/0305957 A1 | 12/2011 | Hirose Yoshikazu | |
| 2012/0064413 A1* | 3/2012 | Schaeffer | H01M 4/73 429/241 |
| 2013/0022860 A1 | 1/2013 | Kogure Koji | |
| 2013/0099749 A1 | 4/2013 | Takahashi Satoru | |
| 2013/0157118 A1 | 6/2013 | Sakai Masanori | |
| 2013/0330637 A1* | 12/2013 | Matsumoto | H01G 11/52 429/344 |
| 2014/0134482 A1 | 5/2014 | Tsutsumi Takao | |

FOREIGN PATENT DOCUMENTS

| | | | |
|---|---|---|---|
| JP | 10162794 A2 | 6/1998 | |
| JP | 11054115 A2 | 2/1999 | |
| JP | 11121008 A2 | 4/1999 | |
| JP | 11233119 A2 | 8/1999 | |
| JP | 11250913 A2 | 9/1999 | |
| JP | 3054255 | 6/2000 | |
| JP | 2002134114 A2 | 5/2002 | |
| JP | 2002134118 A2 | 5/2002 | |
| JP | 2003338284 A2 | 11/2003 | |
| JP | 2003338285 A2 | 11/2003 | |
| JP | 2004071477 A2 | 3/2004 | |
| JP | 2004111198 A2 | 4/2004 | |
| JP | 2004127585 A2 | 4/2004 | |
| JP | 2005302395 A2 | 10/2005 | |
| JP | 2006114313 A2 | 4/2006 | |
| JP | 2006196191 A2 | 7/2006 | |
| JP | 2008277244 A2 | 11/2008 | |
| JP | 2010102916 A2 | 5/2010 | |
| JP | 2012043594 | 3/2012 | |
| JP | 2012079706 A2 | 4/2012 | |
| JP | 2013041848 A2 | 2/2013 | |
| JP | 2013065443 | 4/2013 | |
| JP | 2013073737 A2 | 4/2013 | |
| JP | 2013161606 | 8/2013 | |
| JP | 2013206571 A2 | 10/2013 | |
| JP | 2013211115 A2 | 10/2013 | |
| WO | 1997037393 | 10/1997 | |
| WO | 2005124920 A1 | 12/2005 | |
| WO | 2011108056 A1 | 9/2011 | |
| WO | 2011142072 A1 | 11/2011 | |
| WO | 2012017702 A1 | 2/2012 | |
| WO | 2012042917 A1 | 4/2012 | |
| WO | WO 2012115092 A1 * | 8/2012 | ............. H01G 11/52 |
| WO | 2013005733 A1 | 1/2013 | |
| WO | 2013150754 A1 | 12/2015 | |

* cited by examiner

LEAD-ACID BATTERY

TECHNICAL FIELD

The present invention relates to a lead-acid battery.

BACKGROUND ART

A flooded-type lead-acid battery includes a positive electrode plate, a negative electrode plate, a separator separating the electrode plates, and an electrolyte solution. Patent Document 1 (JP-B-3054255) discloses that: regarding a separator, polyethylene, inorganic powder made of silica or the like, and mineral oil (oil such as lubricant oil) are mixed; the mixture is molded by extrusion; and the mineral oil is then extracted. Patent Document 1 further discloses that the mineral oil is required for the acid resistance or the like of the separator, and is diffused into the electrolyte solution from the separator, which limits the content of the oil.

Patent Document 2 discloses that a negative active material of a flooded-type lead-acid battery contains carbon black, a bisphenol condensate, and a polyacrylic acid. Patent Document 2 discloses that 1.5 mass % of the carbon black, the bisphenol condensate, and the polyacrylic acid are combined to improve regenerative charge accepting performance and low-temperature high rate discharge performance and to allow the turbidity of an electrolyte solution (the concentration of the carbon black in the electrolyte solution) to be reduced.

PRIOR ART DOCUMENTS

Patent Documents

Patent Document 1: JP-B-3054255
Patent Document 2: JP-A-2013-161606

SUMMARY OF THE INVENTION

Problems to be Solved by the Invention

The present inventor studied to improve battery performance by increasing the total pore volume ratio of a separator in an automotive flooded-type lead-acid battery. The increased total pore volume ratio improves the diffusibility of an electrolyte solution, low-temperature high rate discharge performance, and regenerative charge accepting performance or the like. The increase in the total pore volume ratio of the separator makes it necessary to increase the content of oil in order to maintain acid resistance.

The present inventor found in this process that when the total pore volume ratio is increased:
the low-temperature high rate discharge performance may be deteriorated;
the oil may be oxidized on a positive electrode plate, which promotes the softening of a positive electrode material; and
the oil may adhere to carbon black or the like, which pollutes the inner surface of a container.

It is an object of the present invention to provide a lead-acid battery which reduces the softening of a positive electrode material and has excellent low-temperature high rate discharge performance.

Means for Solving the Problems

The present invention provides a lead-acid battery including: a positive electrode plate; a negative electrode plate; and a microporous acid-resistant resin separator, wherein the separator has a total pore volume ratio of 55% or more and less than 75% and the negative electrode plate is made of a negative electrode material containing a bisphenol condensate. The separator may be made of polyethylene and polypropylene or the like.

Preferably, the negative electrode material of the negative electrode plate contains 0.075 mass % or more and less than 0.2 mass % of the bisphenol condensate.

Preferably, the negative electrode material of the negative electrode plate contains 0.10 mass % or more and less than 0.2 mass % of the bisphenol condensate.

Preferably, the negative electrode material of the negative electrode plate contains 0.075 mass % or more and less than 0.175 mass % of the bisphenol condensate.

Preferably, the electrode material of the negative electrode plate contains 0.10 mass % or more and less than 0.175 mass % of the bisphenol condensate.

Preferably, the separator has a total pore volume ratio of 65% or more and less than 75%.

Preferably, the positive electrode plate includes a current collector having four sides each having a frame.

Preferably, the electrode material of the negative electrode plate contains a carbon-based material.

Preferably, the separator contains oil.
Preferably, the separator contains 27% or more of the oil.
Preferably, the separator contains 34% or more of the oil.
Preferably, the negative electrode material contains no polycarboxylic acid.

Preferably, the lead-acid battery is used for a charge control vehicle or an idling stop vehicle.

Preferably, a charge control vehicle or an idling stop vehicle includes the lead-acid battery.

The total pore volume ratio of the separator was measured by using a separator piece dried for 2 hours in a warm air drying machine heated to 105° C., and using a pore diameter distribution measuring device according to a mercury intrusion method. Separators have variations of about ±several percent, and accordingly, the average value of five pieces cut out to 3 mm×10 mm from a separator is employed as the total pore volume ratio, for example. The bisphenol condensate is a condensed product of bisphenol A, S, or F, for example. The bisphenol condensate may have a sulfone group, and further have a carboxy group. It is preferable that the content of the bisphenol condensate is set to 0.075 mass % or more and 0.19 mass % or less, and the average molecular weight is about 8,000 (in terms of sodium polystyrene sulfonate). The content of the bisphenol condensate or the like in the negative electrode material is measured as follows. The lead-acid battery is full-charged, and then disassembled. The electrode material is taken out from the negative electrode plate, washed in water, and dried. This mass is defined as the total amount of the negative electrode material. Next, the bisphenol condensate or the like is extracted from the negative electrode material by using an aqueous sodium hydroxide solution of 1.0 mol/l. The content is measured by UV absorption at the wavelength of 290 nm of the extraction liquid or the like.

FIG. 4 shows the relation between the total pore volume ratio of the polyethylene separator and low-temperature high rate discharge performance or regenerative charge accepting performance. FIG. 4 shows data when the content of the bisphenol condensate in the negative electrode material is 0.075 mass %, and data when the content is 0.19 mass %. The total pore volume ratio has variation shown in the range of ±5%. For example, 60% represents 55% or more and less than 65%, and 70% represents 65% or more and less than 75%. These represent the range of less than ±5% from the central numerical value.

When the total pore volume ratio is increased, acid resistance decreases, which makes it necessary to increase the content of the oil in order to maintain the acid resistance. Specifically, when the total pore volume ratio is 60%, the oil content of the separator used this time is 27 mass %. When the total pore volume ratio is 70%, the oil content is 34 mass %. As shown in FIG. 8, regarding the relation between the total pore volume and the oil amount, the oil amount is increased, as the total pore volume is increased. The oil contained in the separator used in the experiment is mineral oil.

The lead-acid battery has peak performance when the total pore volume ratio is about 70%, and particularly the low-temperature high rate discharge performance is remarkably influenced by the total pore volume ratio. This phenomenon can be presumed to be because the oil in the separator influences the diffusion of an electrolyte solution and the diffusibility of the electrolyte solution does not necessarily follow a simple increase in the total pore volume ratio.

Herein, an example is shown, in which a negative electrode material contains no lignin. The electrode material may contain lignin in the range where the effect of lignin can be ignored such as 0.025 mass % or less. In Examples, the content of carbon black in the negative electrode material is set to 0.2 mass %, but it may be changed in the range of 0.1 to 0.4 mass %, for example.

One of the effects of the bisphenol condensate lies in preventing the shrinkage of the negative electrode material. The results when lignin (lignosulfonic acid) is used are shown in Table 1, and the results when the bisphenol condensate is used are shown in Table 2. These were measured with the total pore volume ratio of the separator changed in the range of 50% to 80%. Both the low-temperature high rate discharge performance and the regenerative charge accepting performance were improved by using the bisphenol condensate in place of lignin. Furthermore, it has become clear that the softening of a positive electrode material is decreased and the pollution of a container is also decreased. It is presumed that, since the bisphenol condensate easily melts in the electrolyte solution as compared with lignin, the bisphenol condensate takes the oil in a colloidal state. For this reason, the oil is less likely to reach the positive electrode plate and be oxidized, which can reduce the softening. It can be presumed that the oil is less likely to be bonded to the carbon black and adhere to the inner surface of the container, which can reduce the pollution of the container.

As shown in FIG. 5, when the bisphenol condensate was excessively added (0.2 mass %), the regenerative charge accepting performance was remarkably deteriorated. On the other hand, when the amount of the bisphenol condensate was less than 0.075 mass %, the low-temperature high rate discharge performance was not enough.

From these, the followings are found:
by setting the total pore volume ratio of the separator to 55% or more and less than 75%, and particularly 65% or more and less than 75%; and
by using not lignin but the bisphenol condensate,
the low-temperature high rate discharge performance is improved, and the softening of the positive electrode material can be reduced.

It is found that, by setting the content of the bisphenol condensate in the negative electrode material to 0.075 mass % or more and less than 0.2 mass %, and particularly 0.075 mass % or more and 0.19 mass % or less, the regenerative charge accepting performance can be improved, and the pollution of the container can also be reduced. When the content is particularly 0.10 mass % or more, the low-temperature high rate discharge performance is more excellent. When the content is 0.175 mass % or less, the regenerative charge accepting performance is more excellent. When the content is particularly 0.10 mass % or more and 0.175 mass % or less, both the low-temperature high rate discharge performance and the regenerative charge accepting performance are remarkably excellent.

When the negative electrode material contains the bisphenol condensate, the hydrogen overvoltage of the negative electrode plate is decreased. As a result, the corrosion of the positive electrode current collector tends to be promoted. Then, when the current collector of the positive electrode plate has four sides each having a frame, for example, a casting grid or punching grid having four sides each having a frame as shown in FIG. 1, the life performance can also be improved.

When the pores of the separator are increased, the oil elution into the electrolyte solution from the separator is increased, which easily promotes the softening of the positive electrode plate. When the electrode material of the negative electrode plate contains a carbon-based material, the carbon-based material also elutes into the electrolyte solution. When the carbon-based material and the oil which elute into the electrolyte solution are bonded, the carbon-based material and the oil stick to the inner wall of the container or an indicator, which makes it impossible to adjust the electrolyte solution level. When the bisphenol condensate is contained, the pollution of the container is suppressed, which is preferable.

When the pores of the separator are increased, the amount of the oil contained in the separator is increased. Furthermore, with the increased amount, the oil elution into the electrolyte solution is increased, which easily promotes the softening of the positive electrode plate. When the bisphenol condensate is contained, the softening can be reduced, which is preferable.

Particularly, when the oil contained in the separator is increased, the amount of the oil elution into the electrolyte solution is increased, which easily promotes the softening of the positive electrode plate. When the oil which elutes into the electrolyte solution and the carbon-based material which flows into the electrolyte solution from the negative electrode plate are bonded, the oil and the carbon-based material stick to the inner wall of the container or the indicator, which makes it impossible to adjust the electrolyte solution level. When the bisphenol condensate is contained, the pollution of the container is suppressed, which is preferable.

The negative electrode material does not need to contain a polycarboxylic acid compound. This is because although the outflow of the carbon from the negative electrode material is effectively suppressed when the negative electrode material contains the polycarboxylic acid compound, the polycarboxylic acid compound is not involved in the suppression of the pollution of the container and may promote the corrosion of a connecting part such as a pole. Specifically, the content of the polycarboxylic acid compound in the negative electrode material is less than 0.005%, preferably 0.002% or less, and more preferably 0.001% or less. The negative electrode material may contain substantially no polycarboxylic acid compound. The phrase "may contain substantially no polycarboxylic acid compound"

means that the polycarboxylic acid compound is not positively added to the negative electrode material.

Since the regenerative charge accepting performance is improved without deteriorating the low-temperature high rate discharge performance, and the softening of the positive electrode material is not promoted, the lead-acid battery is suitable for a charge control vehicle and an idling stop vehicle which perform no overcharge (poor charged state, may be referred to as a PSOC state).

Herein, an electrode plate includes a current collector such as a grid, and an electrode material supported by the current collector. The electrode material contains a material which does not become involved in an electromotive reaction such as a bisphenol condensate, carbon black, barium sulfate, or a synthetic fiber reinforcing material. The negative electrode material mainly contains spongy lead. The positive electrode material mainly contains lead dioxide. The negative electrode material contains no polycarboxylic acid compound. In Examples, the electrode material is referred to as an active material for the sake of ease.

MODE FOR CARRYING OUT THE INVENTION

Hereinafter, a best mode for carrying out the present invention will be shown. When the present invention is carried out, Examples can be appropriately changed in accordance with the common knowledge of those skilled in the art and disclosure of prior art.

EXAMPLES

Carbon black (0.2 mass % in a negative active material), a condensate containing bisphenol A as a skeleton and having a sulfone group (hereinafter, referred to as "bisphenol condensate", average molecular weight: about 8,000, 0.025 mass % to 0.20 mass % in the negative active material), barium sulfate (0.5 mass % in the negative active material), and a synthetic resin fiber of a reinforcing material (0.05 mass % in the negative active material) were added to a lead powder obtained by a ball mill method. Sulfuric acid was added thereto, and these were mixed to produce a paste. An expanded grid (current collector) made of a Pb—Ca—Sn alloy was filled with the paste, and dried and cured to produce an unformed negative electrode plate. The bisphenol condensate may contain bisphenol A as a skeleton, or bisphenol F or S or the like as a skeleton. Alternatively, a mixture thereof may be used as a skeleton.

The negative electrode current collector may have any shape or composition. The barium sulfate and the synthetic resin fiber are unrelated to the present invention. The lead powder may be of any type.

Figure 1:
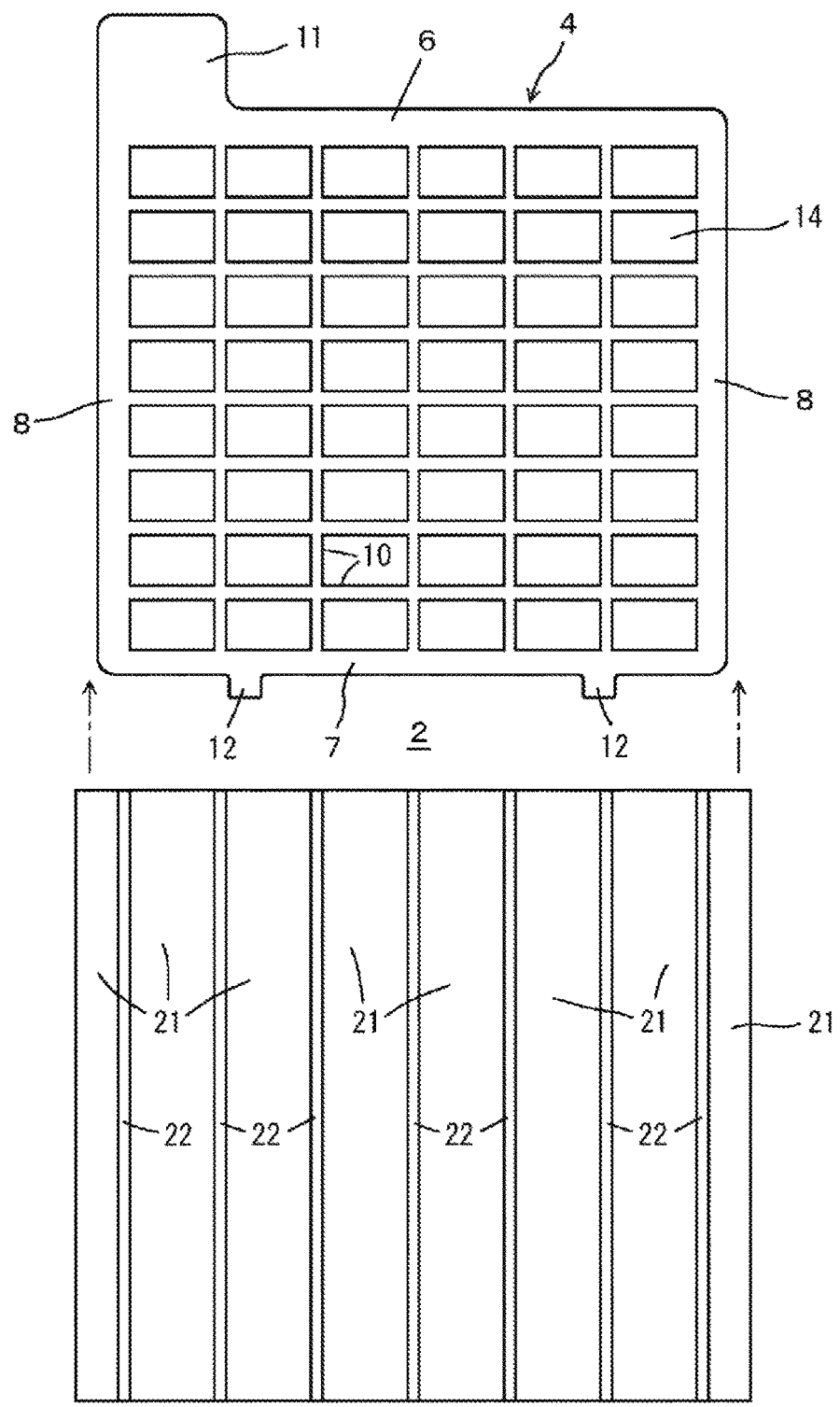
FIG. 1 shows a positive electrode plate and a separator in Examples.

A synthetic resin fiber of a reinforcing material (0.1 mass % in a positive active material) was added to a lead powder obtained by a ball mill method. Sulfuric acid was added thereto, and these were mixed to produce a paste. An expanded grid (current collector) made of a Pb—Ca—Sn alloy was filled with the paste, and dried and aged to produce an unformed positive electrode plate. A positive electrode current collector preferably has four sides each having a frame, as shown in FIG. 1. Four polyethylene separators containing polyethylene and oil and having total pore volume ratios of 45 to 55%, 55 to 65%, 65 to 75%, and 75 to 85% were prepared. The negative electrode plate was wrapped with the polyethylene separators. For example, the total pore volume ratio of "55-65%" represents a total pore volume ratio of 55% or more and less than 65%.

The positive electrode plate which has four sides each having a frame and the polyethylene separator are shown in FIG. 1. Numeral number 2 designates a positive electrode plate, and numeral number 4 designates a current collector (grid) thereof. The positive electrode plate includes an upper frame 6, a lower frame 7, and right and left vertical frames 8. Crosspieces 10 are disposed in vertical and horizontal directions therebetween. Numeral number 11 designates a lug, and numeral number 12 designates a leg. The circumference of the crosspieces 10 is filled with a positive active material 14. The four sides each have a frame. The positive electrode current collector may be an expanded grid having no vertical frame 8 although it is inferior in life performance. The negative electrode current collector may be obtained by casting or punching, or may be an expanded grid.

A separator 20 contains an acid-resistant synthetic resin such as polyethylene and oil, and is microporous. Numeral number 21 designates a bag-like base. The base is opened in an upper direction and closed in other three directions. The base has a thickness of 0.2 mm, for example. Numeral number 22 designates a rib having a height of 0.8 mm, for example. The thickness of the base 21, the height of the rib 22, the pitch of the rib, and the like may set in accordance with a predetermined method. In Examples, the negative electrode plate is wrapped with the separator 20, and the rib 22 faces to the positive electrode plate 2 side. However, the separator 20 is not limited thereto, and the electrode plate does not need to be wrapped with the separator 20. The material contained in the separator only needs to be a resin having acid resistance, and is not limited to polyethylene.

A water-soluble polymer formed of a bisphenol condensate having a sulfonic acid group (hereinafter, merely referred to as a bisphenol condensate) is represented by the chemical formula such as $(-(OH)(RSO_3H)Ph-X-Ph(OH)(R'SO_3H)CH_2-)n$ (1) or $(-(OH)(RSO_3H)Ph-X-Ph(OH)CH_2-)n$ (2), wherein X is a $SO_2$ group, an alkyl group or the like, but two phenyl groups may be bonded directly without including X. In the formulae (1) and (2), two phenyl groups per monomer are contained in the main chain of the bisphenol condensate. One of the two phenyl groups may be contained in a main chain, and the other may be contained in a side chain. The monomer may contain bisphenol and sodium phenolsulfonate. In the above example, dehydration-condensation with formaldehyde $CH_2O$ is used, and a monomer is polymerized via a methylene group —$CH_2$—$CH_2$—. However, the condensation reaction may be carried out with any compound.

Bisphenol S with X being a $SO_2$ group, bisphenol A with X being —$C(CH_3)_2$—, and bisphenol F with X being a —$CH_2$— group provide the equivalent result. The formula (1) type or the formula (2) type or the like may be used. The bisphenol condensate may have any molecular weight, for example, about 4000 to about 250,000. The influence of the molecular weight is small. From the point that the bisphenol condensate is a water-soluble polymer containing an aromatic ring, the bisphenol condensate is similar to lignin sulfonic acid often added to the negative active material. However, from the point that the bisphenol condensate does not have a carboxy group, a methoxy group, an ether bonding part, and an alcoholic hydroxyl group, and from the point that the bisphenol condensate has a single unit structure, the bisphenol condensate is different from the lignin sulfonic acid.

R and R' are proper alkyl groups such as methylene groups. A sulfonic acid group —$SO_3H$ may be directly bonded to a phenyl group without being bonded via the alkyl group. Furthermore, the sulfonic acid group is a functional group for increasing the water solubility of a polymer, and a copolymer of bisphenol S having no sulfonic acid group and sodium phenol methylene sulfonate or the like may be used. Hydrogen of the —$SO_3H$ group may be replaced by proper cations such as Na+ ions, and particularly alkali metal ions in the negative active material. Furthermore, for example, a —$RSO_3H$ group, a —$R'SO_3H$ group, and a —$CH_2$— group are in ortho positions with respect to an —OH group of a phenyl group (Ph). The bisphenol monomers are mutually bonded via the —$CH_2$— group with which dehydration-condensation has been carried out. Many commercially available bisphenol condensates have two sulfonic acid groups per monomer, but the bisphenol condensate may have any number of sulfonic acid groups per monomer.

Five negative electrode plates and four positive electrode plates were stored in a polypropylene container, and sulfuric acid was added thereto. These were subjected to container formation. The formation may be performed by any technique. The storage battery was discharged at a constant current of 250 A at −15° C., and a time until a terminal voltage was decreased to 1 V/cell was measured as low-temperature high rate discharge performance. Subsequently the state of the storage battery was adjusted to 90% of a charge rate, and the storage battery was then charged for 15 seconds at 2.4 V/cell (restricted current: 100 A) at 0° C. The amount of the charged electricity for 15 seconds was measured as charge accepting performance. Furthermore, the cycle of discharge at a discharge current of 25 A for 4 minutes at 40° C. and charge at a charge voltage of 2.47 V/cell at a restricted current of 25 A for 10 minutes was repeated, and the low-temperature high rate discharge performance and the charge accepting performance were measured per 480 cycles. The number of cycles for decreasing the 30 second terminal voltage at low-temperature high rate discharge to 1.2 V/cell was obtained by interpolation, and defined as a life. The pollution of the container was evaluated based on whether a solution level can be visually recognized from the outside of the container after 1440 cycles. Softening was caused in the storage battery in which the container was remarkably polluted, to increase the amount of the positive active material separated from the current collector.

The main cause of the pollution of the container was carbon black to which oil adheres. This can be inferred as follows. The oil added in order to exhibit the acid resistance of the separator, and the carbon added to the negative electrode eluted into sulfuric acid during energization. The oil and the carbon adhered to the container wall near the solution level due to the compatibility (lipophilicity) of the oil, carbon, and container material. When the pollution adheres to the container wall near the solution level, the electrolyte solution level cannot be confirmed from the outside of the container. When an indicator is provided, the pollution adheres to the indicator, which stops the function of the indicator. This disables electrolyte solution level adjustment during water addition, which causes solution spill and solution loss.

When the solution level was not able to be confirmed even in one cell, the pollution of the container was evaluated as "x".

Figure 2:
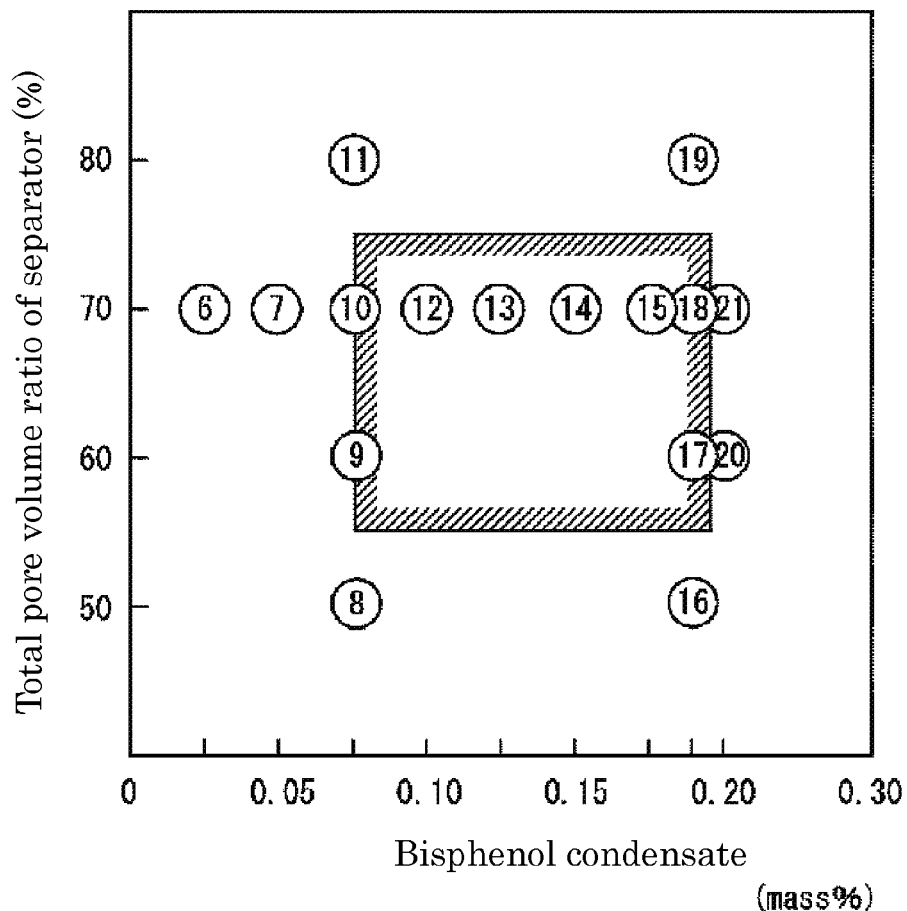
FIG. 2 shows the distribution of samples with respect to the total pore volume ratio of the separator and a bisphenol condensate.

The content of the bisphenol condensate in the negative active material and the total pore volume ratio of the polyethylene separator of each of the samples are shown in FIG. 2. Numbers in FIG. 2 are the sample numbers. The content of the bisphenol condensate is in units of mass %, but it is merely represented by % in the diagram.

Figure 3:
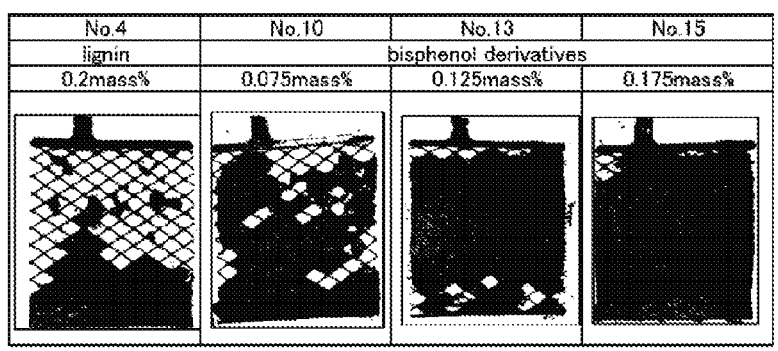
FIG. 3 is a photograph showing a difference between the softening situation of a positive active material in the case of lignin and the softening situation of a positive active material in the case of the bisphenol condensate.

Photographs of FIG. 3 show the situation of the softening of a positive active material in a storage battery (No. 4) in which a negative active material contains 0.2 mass % of lignin, and the situation of the softening of a positive active material in a storage battery containing 0.075 mass % (No. 10), 0.125 mass % (No. 13) or 0.175 mass % (No. 15) of a bisphenol condensate. These photographs were obtained by photographing the disassembled storage battery after 1440 cycles. In the case of lignin, the positive active material was softened, and the positive active material was remarkably separated from the grid. The positive active material was slightly softened in the case of the bisphenol condensate of any content, as compared with the case of lignin.

Figure 4:
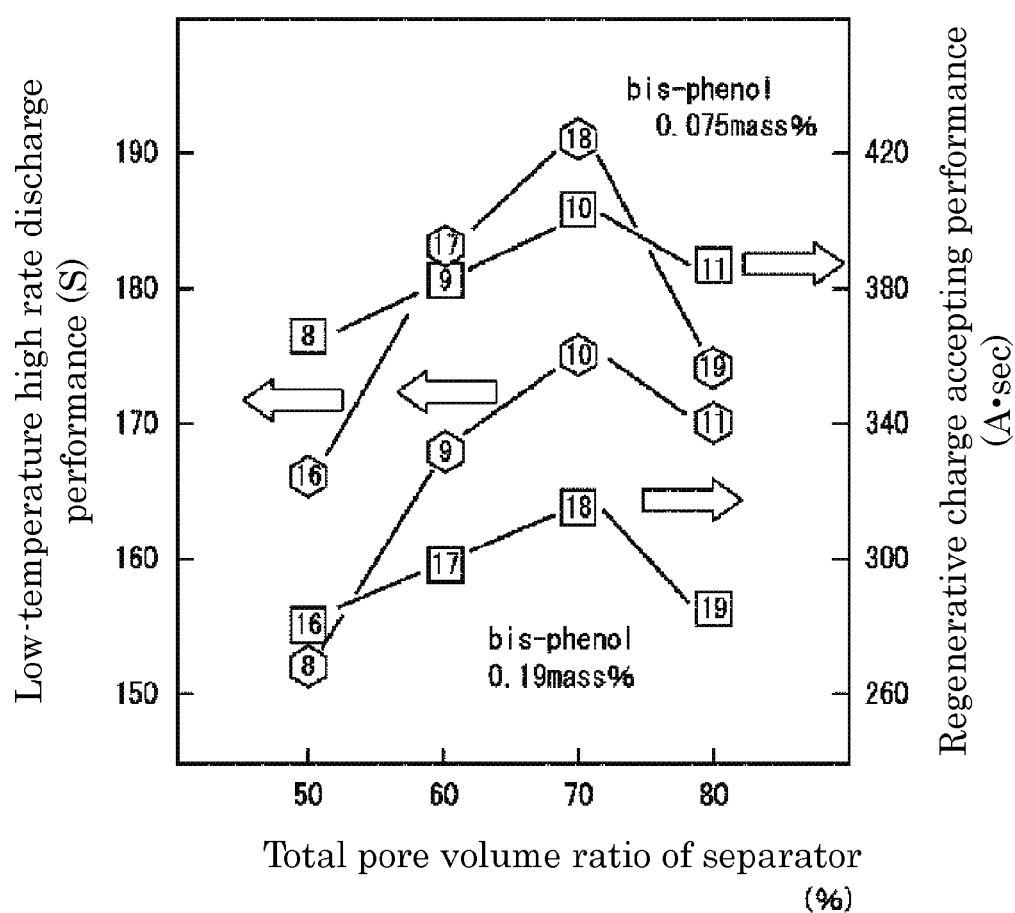
FIG. 4 is a characteristic diagram showing low-temperature high rate discharge performance and regenerative charge accepting performance with respect to the total pore volume ratio of the separator.

FIG. 4 shows the relation between the total pore volume ratio of the separator and the initial value of the low-temperature high rate discharge performance or the initial value of the regenerative charge accepting performance when the content of the bisphenol condensate is 0.075 mass % and 0.19 mass %. Since the highest performance was obtained at the volume ratio of about 70%, the total pore volume ratio is preferably 55% or more and less than 75%, and most preferably 65% or more and less than 75%. In order to improve the low-temperature high rate discharge performance, it is important to improve the flow properties of the electrolyte solution in the separator. The highest performance obtained at the volume ratio of about 70% shows that the oil in the separator has an adverse influence on the low-temperature high rate discharge performance or the like.

Figure 5:
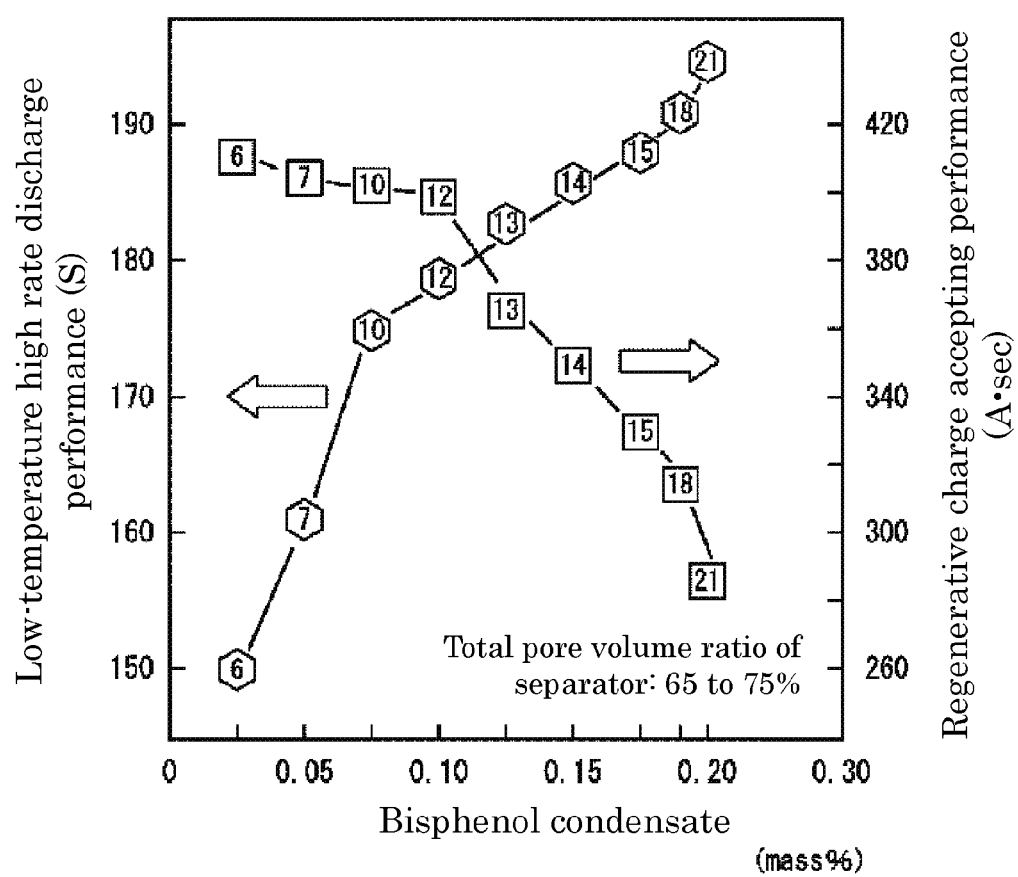
FIG. 5 is a characteristic diagram showing low-temperature high rate discharge performance and regenerative charge accepting performance with respect to the content of the bisphenol condensate.

FIG. 5 shows the relation between the content of the bisphenol condensate and the low-temperature high rate discharge performance or the regenerative charge accepting performance. The total pore volume ratio of the separator is 65 to 75%. When the content of the bisphenol condensate was 0.2 mass %, the regenerative charge accepting performance was remarkably deteriorated, and thus it is necessary to set the content to be less than 0.2 mass %. When the content was less than 0.05 mass %, the low-temperature high rate discharge performance was not enough.

Table 1 shows the results when lignin was used. Table 2 shows the results when the bisphenol condensate was used. When lignin is used and the total pore volume ratio of the separator is set to 65% or more, the container is easily polluted, and thus it is difficult to set the total pore volume ratio to 65% or more. On the other hand, it is found that the change of lignin to the bisphenol condensate improves the low-temperature high rate discharge performance and the regenerative charge accepting performance, and decreases the pollution of the container. The total pore volume ratio of the separator is preferably 55% or more and less than 75%. When the low-temperature high rate discharge performance is important, the content of the bisphenol condensate is preferably increased within the range of 0.075 mass % or more and less than 0.2 mass %. When the regenerative charge accepting performance is important, the content of the bisphenol condensate is preferably decreased within the range. Apart from this, when the bisphenol condensate was used, the softening of the positive active material was also decreased. Furthermore, evaluations on whether various kinds of performances reach the practical range are added to Table 2.

The corrosion of the positive electrode current collector was likely to be promoted when the bisphenol condensate was used, due to a decrease in a hydrogen generation overvoltage in the negative electrode. Then, when the positive electrode current collector having the expanded grid having no vertical frame (sample 12) was compared with the positive electrode current collector having the grid having a vertical frame (sample 22), it was found that the life performance is remarkably improved by providing the vertical frame.

Figure 6:
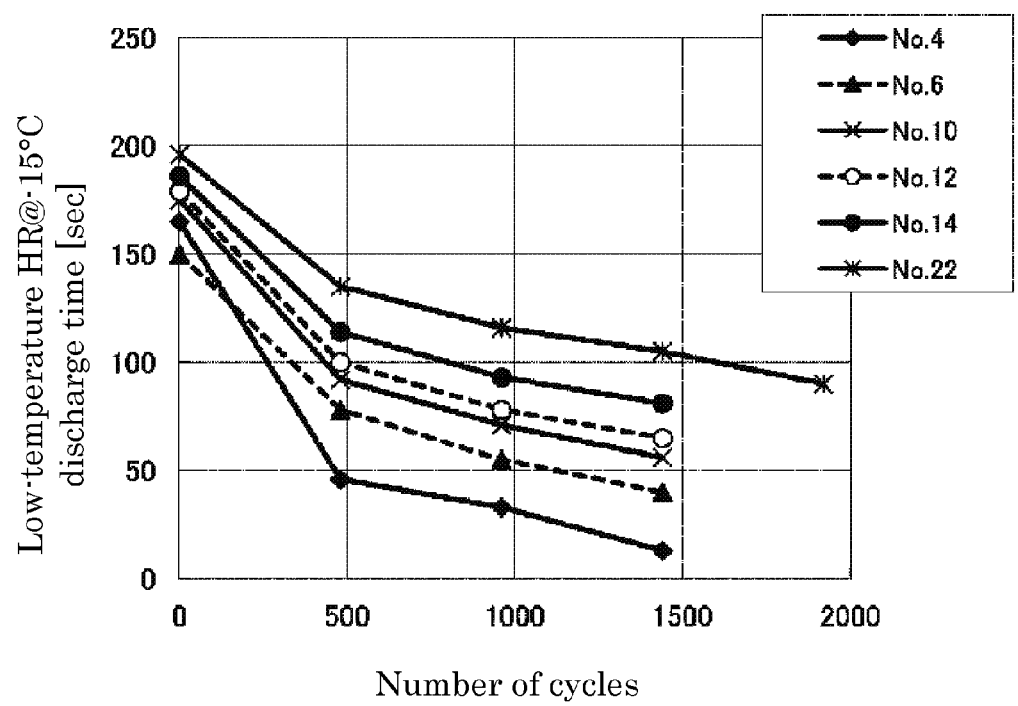
FIG. 6 is a characteristic diagram showing the transition of low-temperature high rate discharge performance with respect to the number of charge-discharge cycles.
Figure 7:
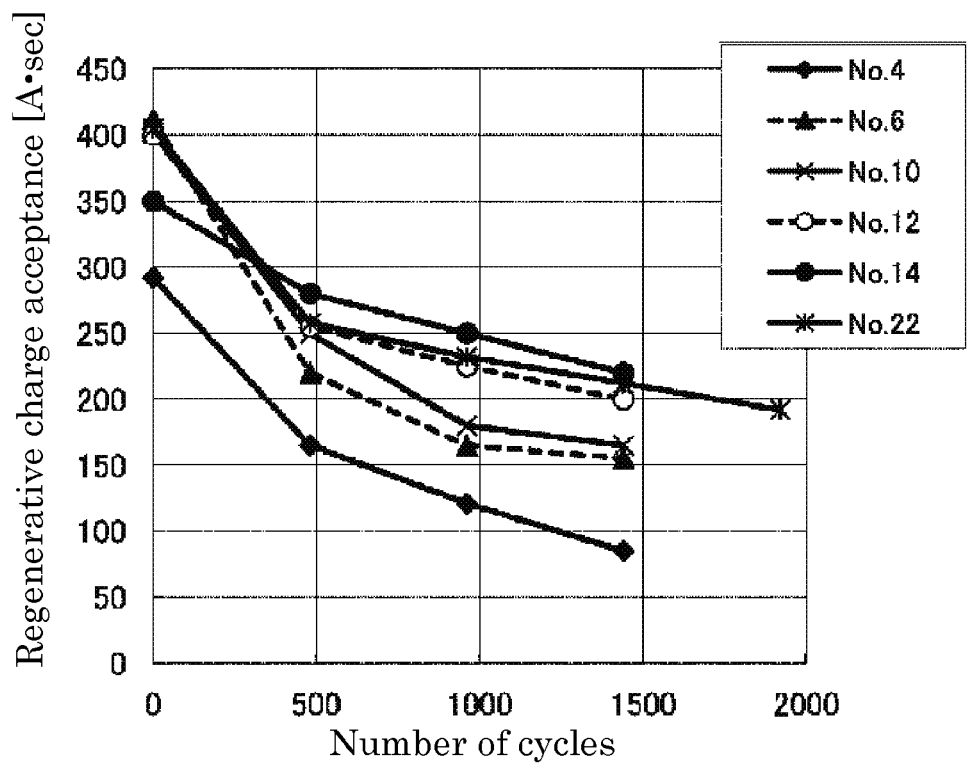
FIG. 7 is a characteristic diagram showing the transition of regenerative charge accepting performance with respect to the number of charge-discharge cycles.
Figure 8:
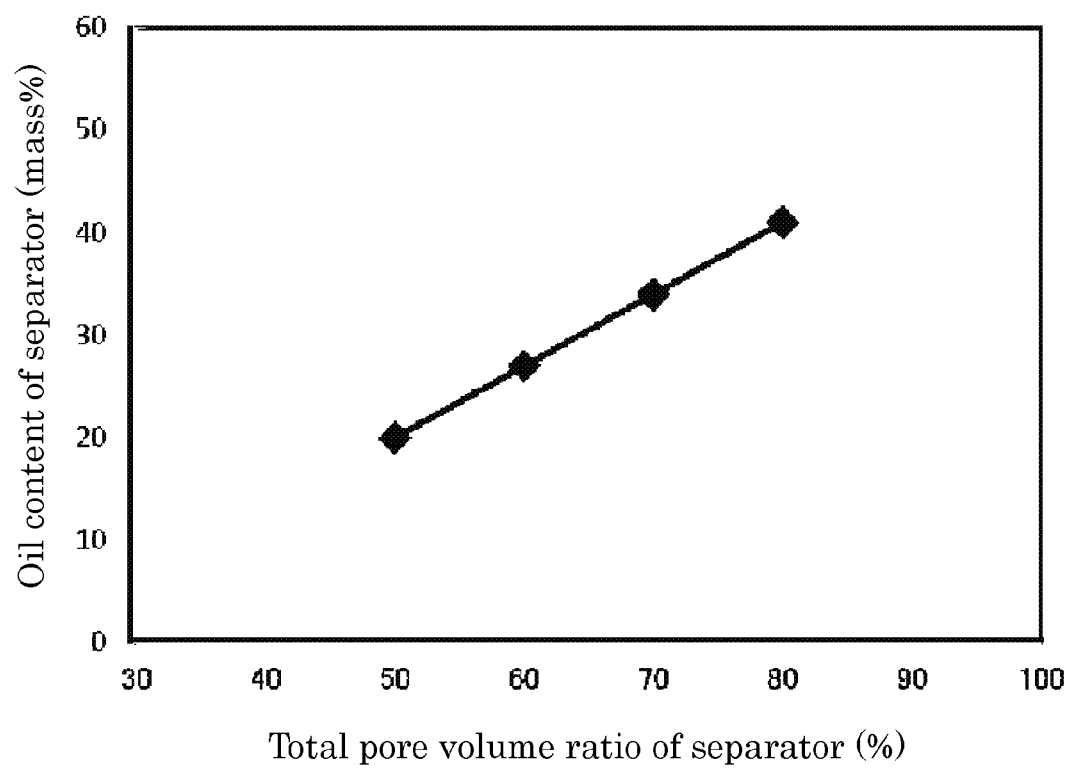
FIG. 8 shows the amount of oil contained in the separator with respect to the total pore volume ratio of the separator.

FIG. 6, FIG. 7, and Table 3 show how the low-temperature high rate discharge performance and the regenerative charge accepting performance change with the number of cycles. The samples containing the bisphenol condensate (samples 10, 12, 14, and 22) have higher durability than those of the samples containing lignin (samples 4 and 6). It is found that the provision of the vertical frame rib in the positive electrode current collector (sample 22) allows the low-temperature high rate discharge performance to be maintained at a higher value than that in the case where the vertical frame rib is not provided (sample 12).

TABLE 1

| | No. 1 | No. 2 | No. 3 | No. 4 | No. 5 |
|---|---|---|---|---|---|
| Total pore volume ratio of separator/% | 65-75 | 45-55 | 55-65 | 65-75 | 75-85 |
| Presence or absence of positive electrode vertical frame rib | | | NA | | |
| Kind of organic shrink-resistant agent | | | Lignosulfonic acid | | |
| Additive amount/% | 0.175 | | | 0.2 | |
| Initial low-temperature high rate/sec | 161 | 140 | 158 | 165 | 160 |
| Initial regenerative charge acceptance/Asec | 297 | 260 | 275 | 292 | 280 |
| Evaluation of container pollution after 1440 cycles | X | ○ | ○ | X | X |

Symbols "○" and "X" represent "good" and "poor," respectively.

TABLE 3

| Cycle | No. 4 | No. 6 | No. 10 | No. 12 | No. 14 | No. 22 |
|---|---|---|---|---|---|---|
| Low-temperature high rate discharge performance (sec) | 0 | 165 | 150 | 175 | 179 | 186 | 196 |
| | 480 | 46 | 78 | 92 | 100 | 114 | 135 |
| | 960 | 33 | 55 | 71 | 78 | 93 | 116 |
| | 1440 | 13 | 40 | 56 | 65 | 81 | 105 |
| | 1920 | | | | | | 90 |
| Regenerative charge accepting performance (Asec) | 0 | 292 | 412 | 402 | 400 | 350 | 405 |
| | 480 | 165 | 220 | 250 | 255 | 280 | 258 |
| | 960 | 121 | 165 | 180 | 225 | 250 | 232 |
| | 1440 | 85 | 155 | 165 | 200 | 220 | 212 |
| | 1920 | | | | | | 192 |

DESCRIPTION OF REFERENCE SIGNS 2 positive electrode plate
4 current collector

TABLE 2

| | No. 6 | No. 7 | No. 8 | No. 9 | No. 10 | No. 11 | No. 12 | No. 13 | No. 14 | No. 15 | No. 16 | No. 17 | No. 18 | No. 19 | No. 20 | No. 21 | No. 22 |
|---|---|---|---|---|---|---|---|---|---|---|---|---|---|---|---|---|---|
| Total pore volume ratio of separator/% | 65-75 | 65-75 | 45-55 | 55-65 | 65-75 | 75-85 | 65-75 | 65-75 | 65-75 | 65-75 | 45-55 | 55-65 | 65-75 | 75-85 | 55-65 | 65-75 | 65-75 |
| Presence or absence of positive electrode vertical frame rib | | | | | | | | | N/A | | | | | | | | A |
| Kind of organic shrink-resistant agent | | | | | | | | Bisphenol condensate | | | | | | | | | |
| Additive amount/% | 0.025 | 0.050 | | 0.075 | | | 0.100 | 0.125 | 0.15 | 0.175 | | 0.190 | | | | 0.200 | 0.100 |
| Initial low-temperature high rate/sec | 150 | 161 | 152 | 168 | 175 | 170 | 179 | 183 | 186 | 188 | 166 | 183 | 191 | 174 | 196 | 195 | 196 |
| Evaluation of low-temperature high rate | x | x | x | ○ | ○ | ○ | ○ | ○ | ○ | ○ | ○ | ○ | ○ | ○ | ○ | ○ | ○ |
| Initial regenerative charge acceptance/Asec | 412 | 405 | 365 | 382 | 402 | 387 | 400 | 366 | 350 | 330 | 280 | 298 | 315 | 285 | 270 | 286 | 405 |
| Regenerative evaluation | ○ | ○ | ○ | ○ | ○ | ○ | ○ | ○ | ○ | ○ | x | ○ | ○ | x | x | x | ○ |
| Evaluation of container pollution after 1440 cycles | x | x | ○ | ○ | ○ | x | ○ | ○ | ○ | ○ | ○ | ○ | ○ | ○ | ○ | ○ | ○ |
| Overall evaluation | x | x | x | ○ | ○ | x | ○ | ○ | ○ | ○ | x | ○ | ○ | x | x | x | ○ |
| Number of life cycles | | | | | | | 1630 | | | | | | | | | | 2120 |

Symbols "o" and "x" represent "good" and "poor," respectively.

6 upper frame
7 lower frame
8 vertical frame
10 crosspiece
11 lug
12 leg
14 positive active material
20 separator
21 base
22 rib

The invention claimed is:

1. A lead-acid battery comprising:
a positive electrode plate;
a negative electrode plate; and
a microporous resin separator,
wherein the separator has a total pore volume ratio of 55% or more and less than 75%, and
the negative electrode plate is made of a negative electrode material containing 0.075 mass % or more and less than 0.2 mass % of a bisphenol condensate.

2. The lead-acid battery according to claim 1, wherein the electrode material of the negative electrode plate contains 0.10 mass % or more and less than 0.2 mass % of the bisphenol condensate.

3. The lead-acid battery according to claim 1, wherein the electrode material of the negative electrode plate contains 0.075 mass % or more and less than 0.175 mass % of the bisphenol condensate.

4. The lead-acid battery according to claim 1, wherein the electrode material of the negative electrode plate contains 0.10 mass % or more and less than 0.175 mass % of the bisphenol condensate.

5. The lead-acid battery according to claim 1, wherein the separator has a total pore volume ratio of 65% or more and less than 75%.

6. The lead-acid battery according to claim 1, wherein the positive electrode plate includes a current collector having four sides each having a frame.

7. The lead-acid battery according to claim 1, wherein the electrode material of the negative electrode plate contains a carbon-based material.

8. The lead-acid battery according to claim 1, wherein the negative electrode material of the negative electrode plate substantially contains no polycarboxylic acid compound.

9. The lead-acid battery according to claim 1, wherein the lead-acid battery is used for a charge control vehicle or an idling stop vehicle.

10. A charge control vehicle or an idling stop vehicle comprising the lead-acid battery according to claim 1.

11. The lead-acid battery according to claim 1, wherein the negative electrode material comprises 0.025 mass % or less of lignin.

12. The lead-acid battery according to claim 1, wherein the negative electrode material comprises no lignin.

13. The lead-acid battery according to claim 1, wherein the negative electrode material comprises 0.1 to 0.4 mass % of carbon black.

14. The lead-acid battery according to claim 1, wherein a molecular weight of the bisphenol condensate is about 4,000 to about 250,000.

15. The lead-acid battery according to claim 1, wherein the negative electrode material comprises less than 0.005% of a polycarboxylic acid compound.

16. The lead-acid battery according to claim 1, wherein the negative electrode material comprises carbon black, barium sulfate, and a synthetic fiber reinforcing material.

* * * * *